United States Patent [19]

Rentschler et al.

[11] 4,051,495
[45] Sept. 27, 1977

[54] SINGLE LENS REFLEX CAMERA WITH INTERCHANGEABLE LENS

[75] Inventors: Waldemar Rentschler; Franz Starp, both of Wildbad, Germany

[73] Assignee: Carl Zeiss Stiftung, Oberkochen, Germany

[21] Appl. No.: 736,706

[22] Filed: Oct. 29, 1976

[30] Foreign Application Priority Data

Nov. 4, 1975   Germany .......................... 2549287

[51] Int. Cl.² .................. G03B 17/00; G03B 19/12
[52] U.S. Cl. ............................ 354/152; 354/201; 354/202; 354/286
[58] Field of Search ............... 354/152, 289, 200, 201, 354/286, 202, 154–156

[56] References Cited

U.S. PATENT DOCUMENTS

| 2,618,201 | 11/1952 | Brohl et al. | 354/286 |
| 3,540,366 | 11/1970 | Noguchi | 354/200 |

*Primary Examiner*—John Gonzales
*Attorney, Agent, or Firm*—Stonebraker, Shepard & Stephens

[57] ABSTRACT

A photographic camera of the single lens reflex type, having provision for interchangeable lenses. Whenever a lens is not fully and properly engaged with and seated on the camera, the image on the focusing screen is blurred or altered from the normal image in a way to attract the attention of the photographer, so that he can make immediate correction before losing the opportunity to take the picture he wants.

12 Claims, 6 Drawing Figures

SINGLE LENS REFLEX CAMERA WITH INTERCHANGEABLE LENS

BACKGROUND OF THE INVENTION

This invention relates to a single lens reflex camera with interchangeable lenses, and more particularly to mechanism for notifying the operator, at an early stage in the picture-taking sequence of operations, that the interchangeable lens is not firmly and completely mounted or seated on the camera body.

When an interchangeable lens is placed on the camera body, it is necessary to make sure that the lens is fully and completely connected to the camera body, not only for the sake of correct optical placement but also for the sake of making sure that the lens does not accidentally drop off of the camera body, as might be the case if it is not completely seated in the proper mounting position. When pictures are to be taken under pressure of time or other conditions of stress, as for example pictures by a press or newspaper photographer, or pictures taken in the midst of a crowd which may be jostling the photographer, it is easy in the excitement or pressure of the moment to change lenses hurriedly and fail to turn the lens mount quite far enough to seat it properly and fully on the camera.

It is known in the art to provide means for blocking the camera release or trigger, when the lens is not properly seated on the camera, thus notifying the operator that something is wrong when he attempts to depress the release member or trigger in order to make the exposure. However, such an indication comes too late, in many cases. The actuation of the camera release is ordinarily the last step or last thing done, when taking a picture. By the time the photographer attempts to press the camera release and thus discovers that his lens is not properly seated, there may be insufficient time to let go the camera release, grasp the interchangeable lens mount, and do whatever is necessary to complete the proper attachment or seating of the lens, and then again put his finger on the camera release to make the exposure. If the photographer desired to take a picture of a fleeting event, the opportunity is gone forever, before correction of the lens mounting can be made.

It is therefore an important object and feature of the present invention, to notify the photographer of the incorrect mounting of the lens, at an earlier stage of the steps or sequence necessary to take the picture, so that there may still be time for corrective action if the interchangeable lens is not correctly mounted. Normally the first thing the photographer does, when deciding to take a particular picture, is to look at the viewfinder or focusing screen, to start to compose the picture. Then he is likely to adjust the focus, and select and adjust the shutter speed if the camera automatically sets the diaphragm aperture, or adjust the diaphragm aperture if the camera automatically sets the shutter speed, or adjust both of these factors if the camera is not adjusting one of them automatically. Finally, after all of these steps have been taken, the photographer presses the camera release plunger, to initiate the actual exposure cycle. As above indicated, it is often too late at this moment to take any necessary corrective action if the lens is not properly seated. Accordingly, the present invention provides mechanism for notifying the photographer of the incorrect seating of the lens, at a much earlier stage, preferably at the time he first looks at the viewfinder or focusing screen. This is done, according to the invention, by providing means for blurring or distorting the image on the focusing screen, whenever the interchangeable lens is not fully and properly seated on the camera body, so that the photographer will immediately see the conspicuously blurred or distorted image the moment he looks at the focusing screen, and thus will immediately know that the lens is not properly mounted and that corrective action must be taken. By receiving this notification early in the sequence of picture taking steps rather than late, there is increased possibility of being able to take corrective action in time to get the desired picture of some fleeting event.

Several arrangements for achieving this blurring or distortion of the image on the focusing screen will be described below.

DESCRIPTION OF THE PREFERRED EMBODIMENTS

Figure 1:
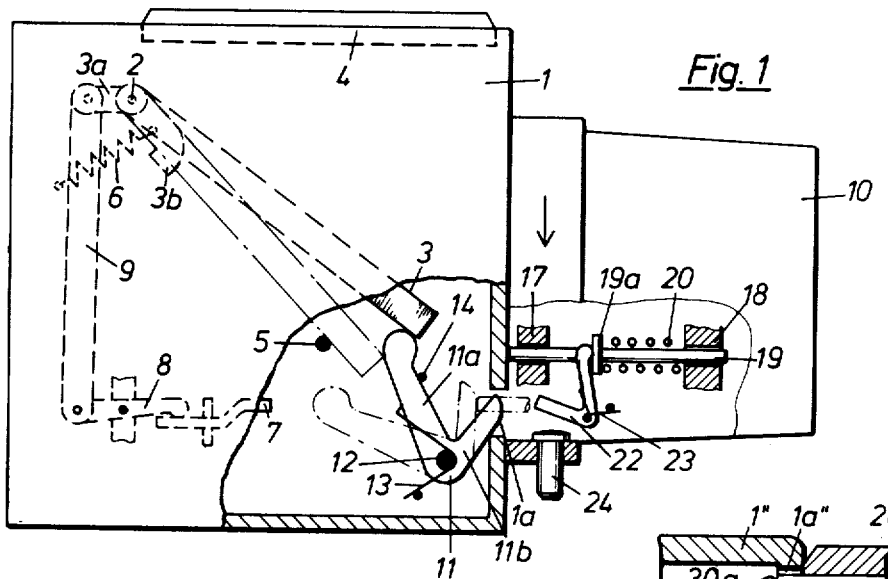
FIG. 1 is a schematic or diagrammatic side elevational view of a camera and associated interchangeable lens, with parts broken away and parts in vertical section, illustrating the first embodiment of the invention in which the reflex mirror of the camera is tilted to blur or distort the image on the focusing screen, whenever the interchangeable lens is not properly mounted.

Referring first to the embodiment illustrated in FIG. 1, there is shown schematically a single lens mirror reflex camera 1 having the usual swinging mirror 3 mounted to swing on a horizontal pivotal axis 2, the mirror serving (when in normal position) to reflect the light entering the camera along the optical axis upwardly onto the usual focusing screen 4. A spring 6 tends to swing the mirror downwardly to its normal focusing position against a fixed stop 5, this focusing position of the mirror being illustrated in dot-dash lines. In order to move the mirror out of the viewfinder position before the actual exposure process, there is provided a conventional mirror mechanism including a disk 7 provided with a bent portion, a double armed lever 8 pivoted on a fixed pivot, and a coupling rod 9 connected at its lower end to the lever 8 and at its upper end to an arm 3a pivoted to swing on the mirror shaft 2 and connected to a second arm 3b having a lug underlying a lateral edge of the mirror. The arrangement is such that when the link or rod 9 is pulled downwardly, swinging the arms 3a and 3b counterclockwise, the mirror will be lifted from its viewfinding position to its picture taking position, out of the way of the light entering the camera and proceeding toward the film plane. However, the mirror can be swung upwardly independently of the rod 9 and arms 3a and 3b, by the mechanism described below. Preferably there is an arm 3b with its lug underlying the edge of the mirror, at each of the opposite lateral edges of the mirror. The spring 6 normally holds the mirror in a position resting against the lateral lugs on the arms 3b.

The housing or mount of an interchangeable lens is schematically shown at 10, and is removably attached to the camera body 1 by any conventional form of attachment, such as a screw coupling or a bayonet coupling, not illustrated because well known in the art. In order to obtain good photographic results, it is important that the interchangeable lens be firmly seated in the proper way, at the interface between the lens mount and the camera body. If this is not done, the possibility of incorrect exposures cannot be excluded, and moreover there is a possibility of having the lens mount accidentally drop off of the camera, particularly if the photographer is being jostled in a crowd.

In order to avoid this possibility of accidentally dropping the lens or of poor photographic results, and to advise the photographer as early as possible of the incorrect attachment of the lens so that he still has an opportunity to effect a correction, mechanism is provided which positively results in a blurring of the viewfinder image by moving the mirror 3 out of the correct viewfinder position when the interchangeable lens is not properly attached. In this embodiment of the invention, there is a double armed lever 11 mounted in the camera body on a fixed shaft 12. A spring 13 tends to rotate this lever 11 in a clockwise direction, to an extent permitted by a fixed stop 14. The arm 11a of this lever underlies the mirror 3, and the spring 13 is strong enough to overcome the spring 6, so that the arm 11a will raise the mirror to the position illustrated partly in full lines and partly in broken lines, thereby effecting a definite blurring of the image on the focusing screen 4.

The second arm 11b of the lever 11 is aligned with and is able to enter an opening 1a in the camera body 1, this opening being within the area covered by the mount of the interchangeable lens 10 when this lens is positioned on the camera. This opening 1a is arranged in the region of the coupling surface intended for attachment of the interchangeable lens 10, and is so arranged that actuating mechanism arranged in the interchangeable lens mount is able to act suddenly on the lever arm 11b when the lens has reaced the proper coupling position.

The actuating mechanism arranged in the interchangeable lens mount 10 comprises essentially a pin 19 displaceably guided by stationary bearings 17 and 18, to move in a direction parallel to the optical axis. A collar 19a is engaged by one end of a relatively strong compression spring 20 surrounding the pin, the other end of which spring presses against the fixed bearing 18. Thus the spring tends to move the pin 19 leftwardly when viewed as in FIG. 1.

As the lens mount is turned to engage the screw threads or the bayonet connection lugs of the lens with those of the camera body, the rear end (left end when viewed as in FIG. 1) of the pin 19 will slide on a portion of the front wall of the camera body. Finally, just as the lens is turned fully to its completely and properly seated position relative to the camera body, the left end of the pin 19 will come opposite the opening 1a in the front wall of the camera body, and on account of the spring 20 the pin will suddenly snap into the opening 1a, engaging the lever arm 11b and swinging the lever 11 from the full line position to the dot-dash line position illustrated. This relieves the upward pressure on the mirror 3 and allows the spring 6 to move the mirror 3 down to the fixed stop 5, determining the normal focusing position of the mirror. The image on the viewfinder screen 4, previously blurred when the mirror was displaced by the lever 11, now becomes clear on the focusing screen, thus indicating to the photographer that the interchangeable lens 10 has been properly and completely seated on the camera. The entry of the pin 19 into the opening 1a serves not only to shift the mirror 3 from the blurred image position to the clear image position, but also to lock the lens against removal from the camera body. In order to be able to move the pin 19 forwardly against the force of the spring 20, to unlock the lens so that it can be removed from the camera body when desired, there is a restoring member in the form of a double armed lever 22 pivoted on a fixed pivot and biased clockwise by a spring 23. One arm of this restoring lever 22 bears against the rear side of the collar 19a. The other arm of the lever lies in the path of travel of a plunger or pin 24 mounted for radial movement in the lens mount. When the fingers encircle the lens mount 10, to grasp it for removing it from the camera body, one finger can press inwardly on the pin 24, thus swinging the lever 22 clockwise to push forwardly on the pin 19 to remove it from the opening 1a in the camera body, so that the lens 10 can be turned in a disengaging direction.

Figure 2:
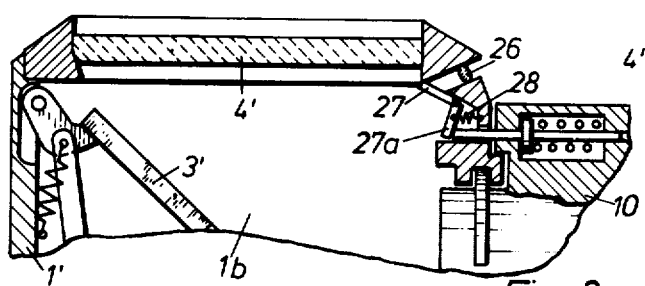
FIG. 2 is a schematic vertical section through a fragment of the camera, illustrating a second embodiment wherein light is purposely admitted to the viewfinding chamber when the lens is not properly mounted, so that such light will blur the image on the screen, to give the desired indication to the operator.

A second embodiment of the invention is illustrated schematically in FIG. 2. The camera body 1' has a mirror 3' in the mirror space 1b. The focusing screen 4' is in the usual position. In this embodiment of the invention, the image is blurred (when the interchangable lens is not properly mounted) by admitting light into the viewfinder chambler 1b through a window 26 in the upper portion of the camera body. This window is closed by a flap 27 pivotally mounted and normally biased in an open direction by the spring 28. When no lens is attached to the camera, or when the lens is attached but not fully and properly seated, the flap 27 is completely open and light enters the viewfinder chamber through the window 26, blurring the image on the focusing screen 4' in a manner which will be conspicuously evident to the person attempting to use the camera.

When the lens is fully and properly seated, however, the axially movable pin located in the lens mount (of the same construction as the pin 19 and associated restoring parts 22 and 24 in FIG. 1) enters an opening in the front of the camera housing as illustrated in FIG. 2 and presses rearwardly against the arm 27a on the flap 27, moving the flap 27 (against the force of the spring 28) to a closed position so that no light can enter through the window 26. Hence the previously blurred image on the focusing screen now becomes clear.

Figure 4:
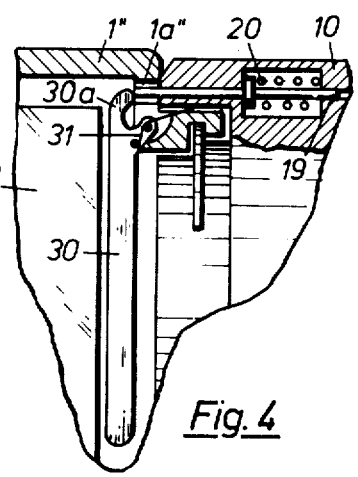
FIG. 4 is a view similar to a fragment of FIG. 3, illustrating the vane in the non-obstructing positions when the lens has been properly mounted.
Figure 3:
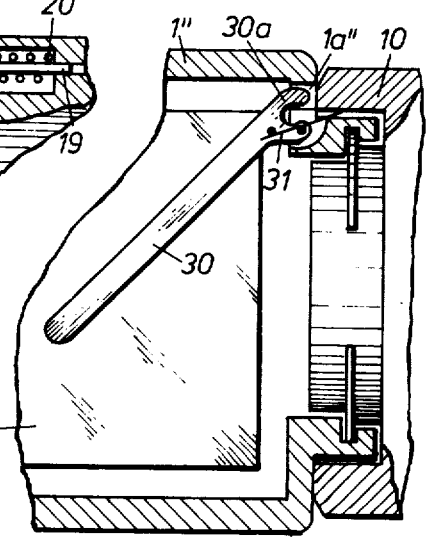
FIG. 3 is a schematic horizontal section through a portion of the camera body and the interchangeable lens, illustrating another form of the invention in which a vane is swung into the region of the focusing screen to be clearly visible thereon or therethrough, when the lens is not properly mounted.

A third embodiment of the invention is illustrated in FIGS. 3 and 4. Here, there is a covering vane 30 pivotally mounted in the camera body 1" to swing in a horizontal plane preferably just below the bottom surface of the focusing screen, although it could swing just above the top surface of the focusing screen, if desired. A light spring 31 tends to swing the vane 30 to the conspicuous obstructing position illustrated in FIG. 3. This informs the photographer that an interchangeable lens is either not connected to the camera at all, or is connected in an imperfect manner.

When the lens is properly seated on the camera, the spring loaded axial pin 19 is in alignment with an opening 1a" in the camera body, and moves rearwardly through this opening, engaging a push finger 30a on the vane 30, and moving the vane from the obstructing position shown in FIG. 3 to the non-obstructing position shown in FIG. 4. The image on the focusing screen is now clear and unobstructed. Just as in FIG. 1 (and in all of the other embodiments) the rearward position of the spring loaded pin 19 serves also to latch the interchangeable lens in place. To remove the lens it is necessary to move the pin 19 axially forwardly, by inward pressure on the pin 24 (shown in FIG. 1 but not shown in the other views).

Figure 5:
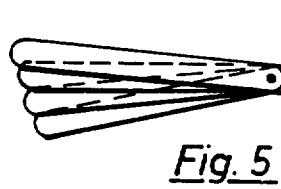
FIG. 5 is a view illustrating a detail of a different form of covering vane, having several leaves or blades pivoted to each other like a fan.

According to a further embodiment of the invention, the effectiveness of the vane 30 can be increased by developing it with a plurality of leaves or blades pivoted to each other like a fan, as illustrated in FIG. 5. When the vane is in the non-obstructing position, the various blades of the vane are all aligned with each other so they do not obstruct the viewfinder image. When the vane is in the obstructing position, the various blades spread out fanwise, making a more conspicuous obstruction.

Figure 6:
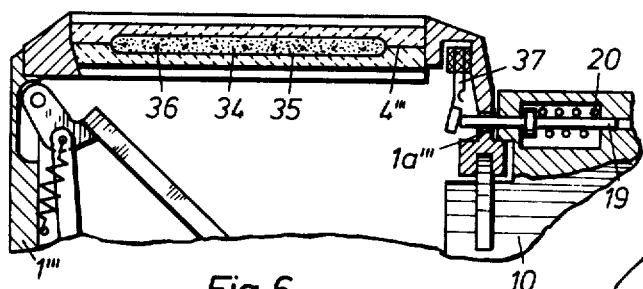
FIG. 6 is a view similar to FIG. 2 illustrating still another embodiment which employs a change in the transparency of the focusing screen, in order to produce the desired blurring.

Still another embodiment is illustrated in FIG. 6. Here, the camera body is shown at 1'", and the focusing screen is seen at 4'". The focusing screen is divided in two parts with a relatively flat hollow space 35 between them which extends practically completely over the area of the screen. This hollow space 35 is filled with known opaque liquid crystals 34 which have the property that when subjected to an electrical voltage, they change their transparency and become cloudy. When no electrical voltage is applied, they are relatively clear and transparent.

To achieve this change, the hollow space 35 is traversed by a series of electrical wires 36, connected to a source of current such as a conventional battery, not shown. The circuit to the wires 36 is controlled by a switch 37 normally closed so that current is supplied and the filling 34 in the space 35 is normally cloudy.

There is an opening 1a'" in the camera body opposite one arm of the switch 37, and in position to be entered by the spring pressed plunger 19 of the lens mount 10, when the lens mount is fully and properly seated on the camera. In the final stage of the seating movement of the lens, the plunger or pin 19 snaps rearwardly through the opening 1a'" and engages one arm of the switch 37 to move it away from the other arm as illustrated in FIG. 6, thus opening the switch, stopping the flow of current, and causing the filling 34 in the space 35 to become transparent. If no lens is mounted on the camera, or if the lens is not fully and properly mounted, the switch 37 will be closed and the filling 34 will be cloudy, thus blurring the image and giving an immediate indication to the photographer when he first looks at the foucsing screen, telling him plainly that the lens is not properly mounted on the camera.

As may be noted from a comparison of the various embodiments shown in FIGS. 1 through 6, the opening serving for entrance of the actuating pin 19 can be arranged at any desired point of the coupling surface or interface between the camera body and the lens. The point chosen for the location of this opening will depend in all cases on the specific means used to effect the blurring of the viewfinder image.

It is seen that in each embodiment of the invention, there are two cooperating parts, one on the camera side of the interface between the camera and the lens, the other on the lens side of the interface. These two parts cooperate with each other when the lens is completely and properly mounted on the camera body, to eliminate or render ineffective the blurring means. When these two parts do not cooperate with each other, blurring of the image on the viewfinder screen occurs, thus giving an immediate and quick indication to the photographer, the moment he looks at the viewfinder as the first step in taking a picture, that something is wrong and that remedial action is necessary.

In all of these embodiments, substantially no extra space is needed. Thus the invention does not require increasing the dimensions of the camera or the lens, at least not to any appreciable extent. All embodiments comprise few additional parts over and above those normally found in cameras, and can be made relatively easily and inexpensively.

What is claimed is:

1. A single lens reflex camera of the type having a mirror movable to and from a normal reflecting position in which the mirror reflects an image of a scene onto a viewfinder screen and having an interchangeable lens detachable from the camera and attachable thereto in a definite functional operative position, characterized by the provision of means for blurring said image on said screen if an interchangeable lens is not attached in said definite operative position.

2. The invention of claim 1, wherein said means for blurring includes means for shifting said mirror away from its said normal reflecting position.

3. The invention of claim 1, wherein said means for blurring includes meas for admitting stray light in interfering relation to the image on said screen.

4. The invention of claim 1, wherein said means for blurring includes means for blocking the viewing of part of the image on said screen.

5. The invention of claim 4, wherein said blocking means comprises a vane movable in a direction approximately parallel to said screen.

6. The invention of claim 5, wherein said vane comprises a plurality of blades pivoted to each other and movable fanwise with respect to each other.

7. The invention of claim 1, wherein said means for blurring includes means for reducing the transmission of light through said screen.

8. The invention of claim 7, wherein said means for reducing transmission of light through said screen comprises liquid crystals within the thickness of a portion of said screen, and electrical means for converting said crystals from a substantially transparent state to a cloudy state.

9. The invention of claim 1, wherein said means for blurring said image is normally effective in the absence of an interchangeable lens correctly attached to the camera in said definite operative position, and wherein the act of placing a lens in said definite operative position automatically renders said blurring means inoperative.

10. The invention of claim 1, wherein there is an interface between said camera and said lens, and wherein said camera has an opening in the region of said interface, and said lens has a movable part movable into said opening when and only when said lens is attached to said camera in said definite operative position, and said camera includes a blurring control member movable adjacent said opening and moved by said movable part of said lens when said lens is placed in said definite operative position, to shift said control member from a blurring-effective position to a blurring-ineffective position.

11. The invention of claim 10, wherein said movable part on said lens is a spring loaded pin tending to move into said opening as the lens is being applied to the camera and snapping into said opening when the lens reaches a fully seated operative position on said camera.

12. The invention of claim 11, wherein said pin serves, when in said opening, to latch said lens against removal from said camera, further including means for retracting said pin from said opening to permit removal of said lens.

* * * * *